(12) United States Patent
Sardat

(10) Patent No.: US 8,072,782 B2
(45) Date of Patent: Dec. 6, 2011

(54) SYSTEM FOR GENERATING A REGULATED TENSION SUPPLYING AN ELECTRIC ORGAN

(75) Inventor: Pierre Sardat, Le Raincy (FR)

(73) Assignee: Valeo Etudes Electroniques, Creteil (FR)

( * ) Notice: Subject to any disclaimer, the term of this patent is extended or adjusted under 35 U.S.C. 154(b) by 312 days.

(21) Appl. No.: 12/385,824

(22) Filed: Apr. 21, 2009

(65) Prior Publication Data

US 2009/0267410 A1    Oct. 29, 2009

(30) Foreign Application Priority Data

Apr. 21, 2008  (FR) ...................................... 08 52686

(51) Int. Cl.
*H02M 3/338* (2006.01)

(52) U.S. Cl. ........................................... 363/19; 307/17
(58) Field of Classification Search .................... 363/18, 363/19, 97, 21.12, 21.18; 323/267; 307/11, 307/17

See application file for complete search history.

(56) References Cited

U.S. PATENT DOCUMENTS 5,995,382 A * 11/1999 Miyazaki et al. ............... 363/19
2008/0037296 A1  2/2008 Hsu et al.

FOREIGN PATENT DOCUMENTS

SU           1 661 938 A1    7/1991

* cited by examiner

*Primary Examiner* — Gary L Laxton
(74) *Attorney, Agent, or Firm* — Oliff & Berridge, PLC

(57) ABSTRACT

The device (10) comprises an energy-storage transformer (14) having magnetically coupled primary and secondary windings (P and L1, L2, L3); a primary circuit (20) connecting the power supply source to a ground (M), and comprising the primary winding (P) and a static main switch (22) connected in series; a secondary winding (S1, S2, S3) designed to be connected to a load, and including the secondary winding (L1, L2, L3); and voltage control means (34) for controlling the static main switch (22) and comprising a first static control switch (36) connecting a control terminal (22A) of the static main switch (22) to ground (M). More particularly, the voltage control means (34) of the static main switch (22) include a second static control switch (38) connecting the control terminal (22A) of the static main switch (22) to ground (M), closure of the first control switch (36) triggering closure of the second control switch (38), and opening of the second control switch (38) being delayed relative to opening of the first control switch (36).

15 Claims, 4 Drawing Sheets

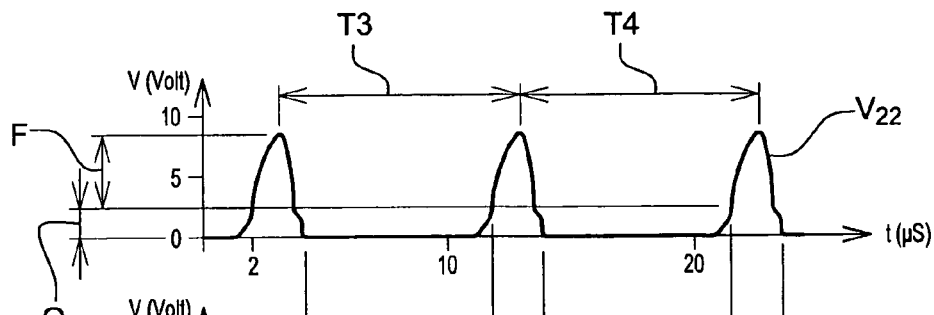
Fig. 6
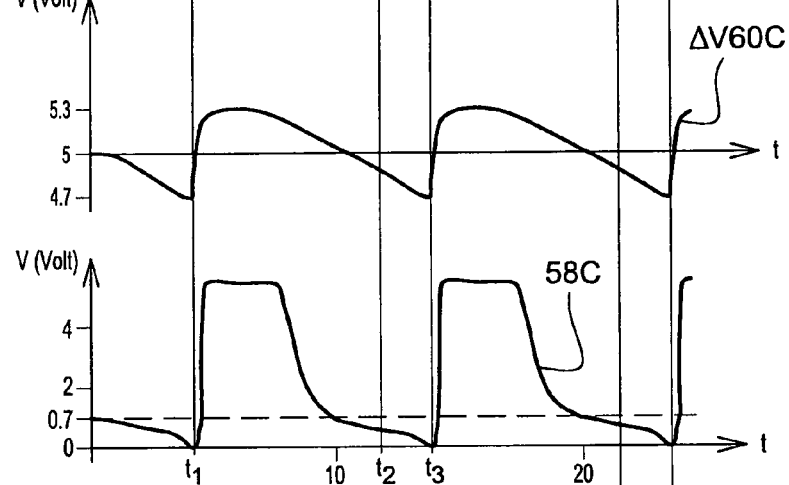
Fig. 7
Fig. 8
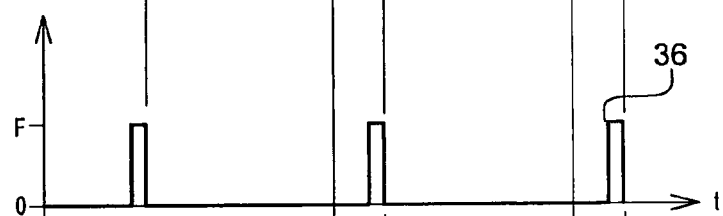
Fig. 9
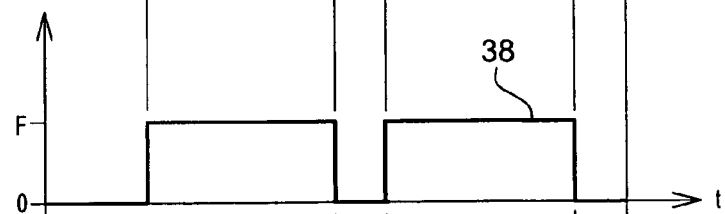
Fig. 10
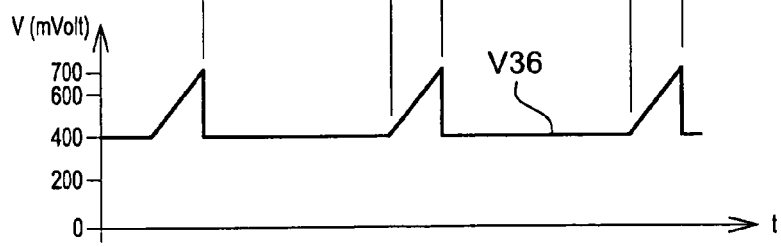
Fig. 11

SYSTEM FOR GENERATING A REGULATED TENSION SUPPLYING AN ELECTRIC ORGAN

Field of the Invention

The present invention relates to the technical field of devices for generating a regulated power supply voltage for an electric member from a voltage of an electric power supply source such as a motor vehicle battery.

BACKGROUND OF THE INVENTION

In general, the voltage delivered by the battery of a motor vehicle is liable to vary, and runs the risk of damaging the electric members of the power supply network. It is then necessary to provide a device for generating a regulated voltage from the voltage of the source.

A known device comprises a "chopper" or switch mode power supply (SMPS) of the type having a "flyback" converter.

In conventional manner, such a device comprises:
  an energy-storage transformer having magnetically coupled primary and secondary windings;
  a primary circuit connecting the power supply source to a ground, and comprising the primary winding and a static main switch connected in series; and
  a secondary winding designed to be connected to a load, and including the secondary winding.

In general, such a device operates cyclically at a predetermined frequency referred to as the switching frequency. In particular, each cycle comprises two stages: a stage of storing magnetic energy, also referred to as the "inlet" stage, during which the main switch is in the closed state; and a state of delivering magnetic energy, also referred to as the "outlet" stage, during which the main switch is in the open state.

The secondary circuit generally comprises a rectifier element connected in series with the secondary winding, and a capacitor element connected in parallel with the secondary winding and the rectifier element, and designed to deliver the regulated output voltage across its terminals.

During the input stage, closure of the main switch allows the input voltage to be applied to the primary winding, thereby causing a primary current to appear and thus storing magnetic energy in the transformer. The rectifier element is in the off state and then prevents current from flowing through the secondary winding, and the capacitor element discharges through the load.

During the output stage, opening the main switch prevents the primary current from flowing in the primary circuit. Conservation of the magnetic energy stored in the transformer then causes a secondary current to appear that flows in the flow direction of the rectifier element in the secondary circuit, thereby enabling the capacitor element to be charged. The magnitude of the current flowing in the secondary circuit decreases until there is no more magnetic energy in the transformer.

In order to control the opening and closing of the main switch in cyclical manner, the device includes voltage control means for the static main switch.

Such control means generally comprise a static control switch connecting the control terminal of the static main switch to ground and a feedback circuit connecting the control terminal of the main static switch to the secondary circuit, the feedback circuit then being activated on opening of the main switch. The feedback circuit serves in particular to guarantee that the main switch opens fully.

When the magnitude of the primary current reaches a predetermined threshold value, the static control switch switches from the open state to the closed state, thereby causing the control terminal of the main switch to be connected to ground. This causes the main switch to open and activates the feedback circuit. The main switch then remains open until the magnitude of the secondary current becomes zero as a result of the magnetic energy stored in the transformer being used up, thereby causing the main switch to close immediately.

SUMMARY OF THE INVENTION

The drawback of those control means is that they do not enable the chopper frequency of the main switch to be controlled accurately, in such a manner as to optimize the efficiency of the device. The durations of the closed and open states of the main switch are determined both by the values of the input voltage and by the resistance of the output load. In particular, when the output load resistance is high, the durations of the open and closed states of the switch are relatively short and the chopping frequency is relatively high. In the event of a sudden rise in the input voltage, a large quantity of energy is then transmitted to the secondary circuit at this very high chopping frequency, running the risk of damaging the loads.

An application specific integrated circuit (ASIC) is also known in the state of the art for use in such control means. Nevertheless, the drawback of such a component is that it does not enable accurate control to be provided over the parameters of temperature, resistance to vibration, and humidity. The control means are constituted by an integrated circuit on silicon with physical properties that are difficult to control. Furthermore, such a component is relatively expensive.

A particular object of the invention is to provide a device for generating a regulated voltage that enables a regulated voltage to be obtained accurately and reliably without recourse to complex components.

To this end, the invention provides in particular a device for generating a regulated output voltage from an input voltage coming from an electric power supply source, the device being of the type comprising:
  an energy-storage transformer having magnetically coupled primary and secondary windings;
  a primary circuit connecting the power supply source to a ground, and comprising the primary winding and a static main switch connected in series;
  a secondary winding designed to be connected to a load, and including the secondary winding; and
  voltage control means for controlling the static main switch and comprising a first static control switch connecting a control terminal of the static main switch to ground;
  the device being characterized in that the voltage control means of the static main switch include a second static control switch connecting the control terminal of the static main switch to ground, closure of the first control switch triggering closure of the second control switch, and opening of the second control switch being delayed relative to opening of the first control switch.

The opening and closing sequence of the two control switches thus enables the chopping frequency of the device to be controlled by using means that are simple and that present temperature properties that are easily controllable, unlike an ASIC type component having temperature and electrical properties that are relatively complex. In particular, because the device has a second control switch of closure that is triggered by the first switch closing and that itself opens with a delay after opening of the first switch, it is possible to incorporate a constant timing duration during which the main switch is held in the open state.

A device of the invention may also include one or more of the following characteristics:

the control means comprise a first control circuit for controlling the first static switch as a function of a first parameter that depends on the magnitude of the current flowing in the primary circuit;

the first control circuit comprises a first branch connecting a control terminal of the first switch to a first resistor element forming a shunt, the shunt being connected in the primary circuit in series with the primary winding and the main switch;

the control parameter of the first switch also depends on a correction voltage generated when a reference threshold voltage is exceeded by the output voltage and/or when the output voltage varies while the output voltage remains below the reference threshold voltage;

the first control circuit further comprises a second branch connecting the control terminal of the first switch to a second resistor element forming a shunt and delivering the correction voltage across its terminals;

the control means comprise a correction generator circuit for generating a correction voltage for correcting the output voltage, said circuit connecting an output voltage generator terminal of the secondary circuit to ground and comprising a second shunt and a reference member connected in series with the second shunt, said reference member allowing current to flow through the second shunt only in the event of the output voltage exceeding the reference threshold voltage;

the reference member comprises a zener diode having a reverse voltage of value substantially equal to the value of the reference threshold voltage;

the correction generator circuit further comprises a limiter member for limiting variations in the output voltage when the output voltage remains below the reference threshold voltage, the limiter member being connected in parallel with the reference member and allowing current to flow through the second shunt only in the event of a variation in the output voltage;

the first control switch and the reference member are of the semiconductor junction type, with the semiconductor junctions having thermal effects that compensate each other;

the control means comprise a second control circuit for controlling the second static switch as a function of a second parameter depending on a reversal of the voltage across the terminals of the secondary winding;

the second control circuit comprises a first branch connecting a control terminal of the second switch to a third resistor element and a second branch connecting the control terminal of the second switch to the secondary winding and including a capacitor element designed to be charged through the third resistor element and a rectifier element connected in series with the capacitor element in such a manner that the capacitor element is caused to be charged by a reversal of the voltage across the terminals of the secondary winding;

the device includes a feedback circuit comprising a capacitor element and a resistor element connected in series with the capacitor element and in which the feedback circuit connects the control terminal of the main switch to the secondary winding;

the voltage control means for controlling the main switch comprise a control circuit for closing the main switch and designed to be activated during opening of the second control switch;

the closure control circuit connects the control terminal of the main switch to the secondary winding and comprises a capacitor element and a rectifier element connected in series with the capacitor element, the capacitor element being caused to charge by a reversal of the voltage across the terminals of the secondary winding and the capacitor element being caused to discharge by the second control switch opening;

the closure control circuit further comprises a resistor element connected in parallel with the capacitor element of the circuit in such a manner that the rate of discharge of the capacitor element depends on the resistance of the resistor element;

the main switch, and the first and second control switches are of a type selected from bipolar transistors and field-effect transistors, the control terminal of a bipolar transistor being a base of the transistor, and the control terminal of a field-effect transistor being a grid of the transistor; and the transformer has at least two secondary windings together with as many secondary circuits, each for connection to a respective load.

BRIEF DESCRIPTION OF THE DRAWINGS

The invention can be better understood on reading the following description given purely by way of example and made with reference to the accompanying drawings, in which:

FIGS. 3 to 8 and 11 to 15 are graphs, each showing a curve plotting variation in a voltage signal as a function of time, for various different points in the electrical circuit of the FIG. 2 device; and FIGS. 9 and 10 are graphs showing diagrammatically the opening and closing sequence for two switches of the device as a function of time.

DETAILED DESCRIPTION

Figure 1:
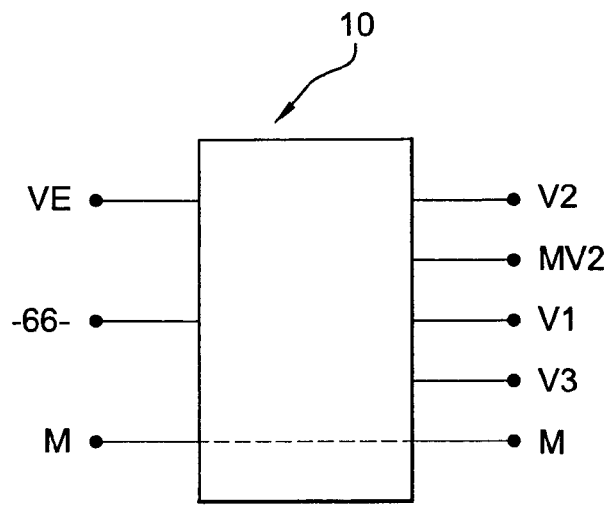
FIG. 1 is a diagrammatic view of a device of the invention for generating a regulated voltage from an input voltage.

FIG. 1 shows a device of the invention for generating at least one regulated output voltage from an input voltage VE. The device is given overall reference 10.

In this example, the voltage VE is generated from an electric power supply source constituted by a motor vehicle battery, and the regulated output voltage is for electrically powering one or more electric members (not shown) of a motor vehicle. In particular, and as shown in FIG. 1, the device 10 is designed to generate more than three regulated output voltages V1, V2, and V3. In particular, in this example, the voltage V2 is a floating voltage, i.e. it is isolated, being electrically isolated from a reference ground M. For example, the input voltage VE has a value of about 12 volts, with the voltages V1, V3 having respective values of 12 volts and 5 volts, and the floating voltage V2 having a value of 12 volts. The output voltage V2 is referenced relative to a potential MV2 of the circuit of the device 10.

Figure 2:
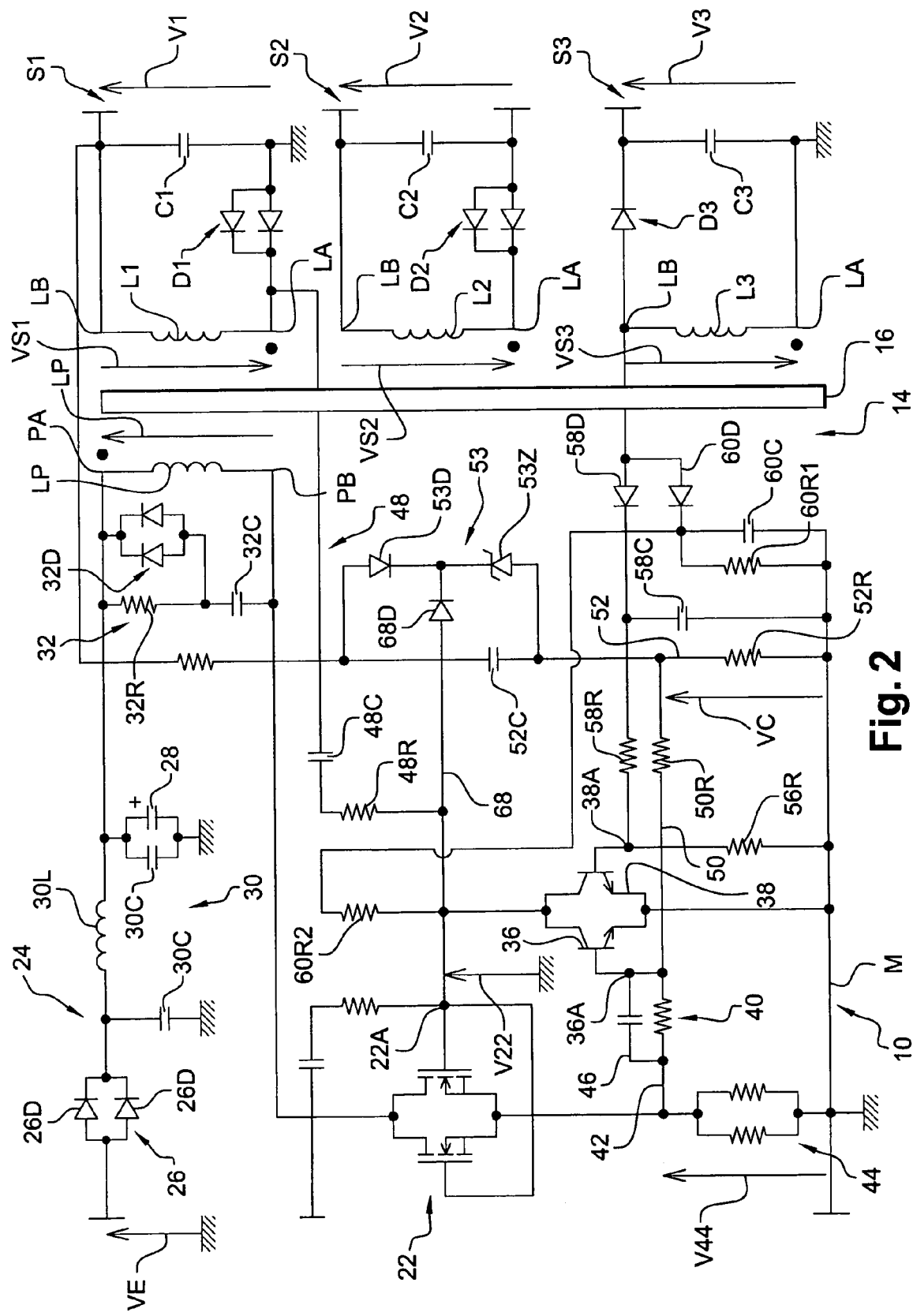
FIG. 2 is a schematic of an electrical circuit constituting the device shown in FIG. 1.
Figure 12:
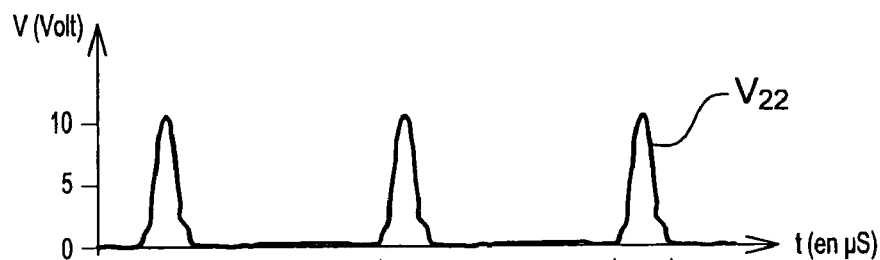
Figure 13:
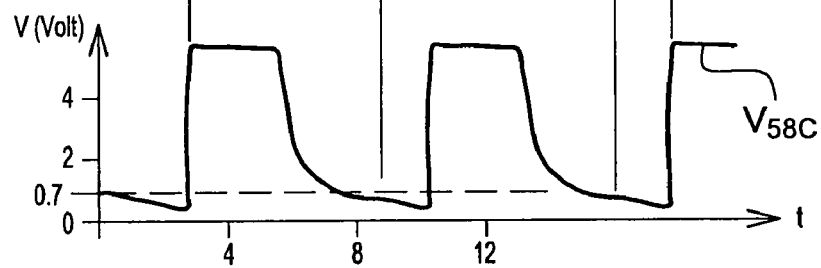
Figure 14:
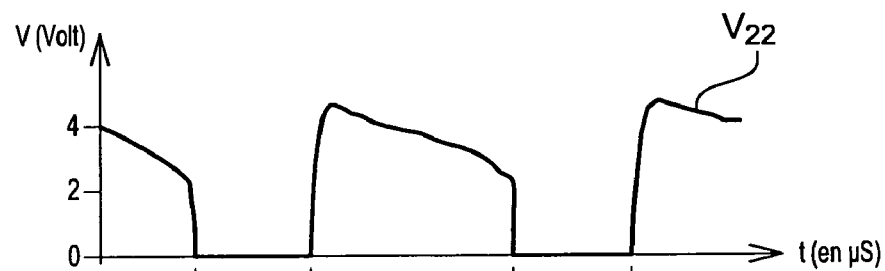
Figure 15:
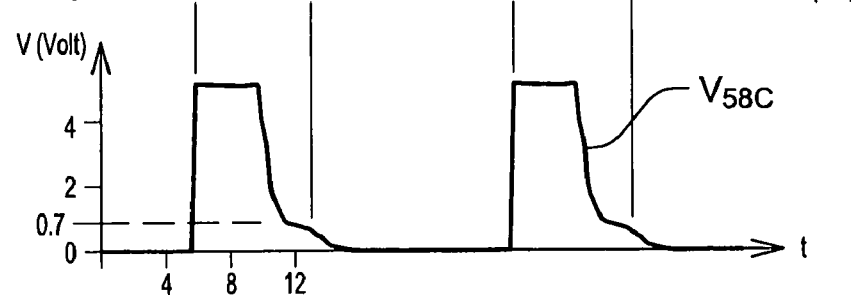

The device 10 comprises a circuit 12 shown in detail in FIG. 2. The circuit 12 comprises an energy-storage transformer 14 having an air gap 16, a primary winding Lp, and secondary windings magnetically coupled together. In the device 10 of the example described, the transformer 14 has three secondary windings L1, L2, and L3 for generating the three respective regulated output voltages V1, V2, and V3. Naturally, the transformer 14 could have more than three secondary windings.

Each primary or secondary winding is provided with two end terminals and is defined by a number of turns and by a turn winding direction, the input of a winding being identified by a dot situated at one end of the winding. Below, the voltage across the terminals of a winding designates the potential difference in the turn winding direction, i.e. between the input and the output of the winding.

In particular, the primary winding Lp is defined by a number of turns Np and a turn winding direction going from its end PA to its end PB, and each of the three secondary windings is defined by a respective number of turns N1, N2, and N3, with the turn winding direction of each secondary winding being opposite to the turn winding direction of the primary winding, each secondary winding having end terminals LA and LB.

In particular, when the voltage Vp is positive, the voltages VS1, VS2, and VS3 are likewise positive.

The device 10 further includes a primary circuit 20 connecting the power supply source to a ground M and comprising the primary winding Lp connected in series with a static main switch 22.

The static main switch 22 is provided with a control terminal 22A. The main switch 22 is preferably a metal oxide on silicon field-effect transistor (MOSFET) having a grid forming the control terminal 22A. In the example shown, the main switch 22 comprises a set of two field-effect transistors connected in parallel. By way of example, the switch 22 is in the closed state when the voltage V22 at its control terminal is greater than 2 volts, and it is in the open state otherwise.

The primary circuit 20 also includes filter means 24 for filtering the input voltage and connected in series with the primary winding between the power supply source and the primary winding. The filter means 24 serve to protect the device 10 simultaneously from input voltage surges, from a polarity reversal of the battery terminals, and from electromagnetic interference.

For this purpose, the filter means 24 comprises a rectifier element 26 such as a diode, or as in the example shown in FIG. 2, a set of two diodes 26D connected in parallel. The rectifier element 26 serves for example to prevent current from flowing in the event of the battery terminals being reversed by accident.

Furthermore, the filter means 24 also comprise an energy-storage capacitor element 28 designed to be charged and to form an additional power supply source, e.g. in the event of a sudden drop in the voltage VE generated by the battery, associated with an LC type filter circuit 30 comprising an inductor 30L together with two capacitor elements 30C serving to filter the high frequency voltage signals generated by the device 10.

The primary circuit 20 also has means 32 connected in parallel with the primary winding P to limit the rise in the temperature of the main switch 22 in operation, by forming in conventional manner a "switching assistance circuit" or "protection circuit". These means 32 comprise in conventional manner a resistor 32R connected in parallel with a rectifier element 32D constituted by a set of two diodes and a capacitor element 32C connected in series with the set formed by the resistor 32R and the diodes 32D. The circuit 32 serves to limit heating of the transistors forming the main switch 22 by causing the current flowing in the primary circuit 20 to be bypassed through the resistor 32R, in particular when the main switch 22 goes from the closed state to the open state.

The device 10 also comprises at least one secondary circuit, and in this example three secondary circuits S1, S2, and S3, each secondary circuit being designed for connection to one or more loads (not shown), e.g. an electric member of a motor vehicle.

Each secondary circuit S1, S2, S3 includes a corresponding secondary winding L1, L2, L3. Each secondary circuit S1, S2, S3 also comprises a rectifier element D1, D2, D3 connected in series with the secondary winding L1, L2, L3 and a capacitor element C1, C2, C3 connected in parallel with the secondary winding L1, L2, L3 and the rectifier element D1, D2, D3, and designed to supply at its terminals the output voltage V1, V2, V3.

In particular, each rectifier element D1, D2, D3 comprises for example one diode (secondary circuit S3), or optionally a set of two diodes connected in parallel (secondary circuits S2, S1).

When the main switch 22 goes from the closed state to the open state, the magnitude of the current flowing in the primary circuit 20 drops to zero and the magnetic energy stored in the air gap 16 is restored to each secondary circuit S1, S2, S3 via each of the secondary windings. In particular, the induced voltage VS1, VS2, VS3 across the terminals of each secondary winding L1, L2, L3 becomes negative and the diodes of the elements D1, D2, D3 go from the off state to the on state, thereby allowing the corresponding capacitor elements C1, C2, C3 to be charged and subsequently discharged via the corresponding electric members.

Otherwise, i.e. when the main switch 22 goes from the open state to the closed state, the magnitude of the primary current increases linearly in the primary circuit 20 and the voltage Vp across the terminals of the primary winding Lp becomes positive. The voltage across the terminals of each secondary winding is also positive, and the diodes D1, D2, D3 are consequently in the off state. Each capacitor element C1, C2, C3 continues to discharge through the corresponding electric member.

In order to control the opening and the closing of the main switch 22, the device 10 also includes control means 34 for controlling the main switch 22.

These control means 34 comprise a first static control switch 36 connecting the control terminal 22A of the static main switch 22 to ground M, and a second static control switch 38 connecting the control terminal 22A of the static main switch 22 to ground M.

Each control switch 36, 38 is provided with a respective voltage control terminal 36A, 38A, the control switches 36, 38 in the example shown in FIG. 1 being constituted by bipolar transistors, the base of each of these transistors forming the control terminal thereof. Furthermore, and preferably, the transistors 36, 38 are interconnected via their respective collectors and emitters. More precisely, the transistors 36, 38 are in the closed state when the respective control voltages V36, V38 on their respective control terminals 36A, 38A are greater than substantially 0.6 volts, and otherwise they are in their open state.

In accordance with the invention, closure of the first control switch 36 triggers closure of the second control switch 38, and opening of the second control switch 38 is delayed relative to the opening of the first control switch 36.

In other words, the first switch 36 has a function of triggering the opening of the main switch 22, and the second switch 38 has a relay function of enabling the main switch 22 to be held open by maintaining the connection between the control terminal 22A of the main switch 22 and ground M for a predetermined duration. For example, the main switch 22 is in the closed state when the voltage at its control terminal 22A is greater than 2 volts, and is otherwise in the open state. The opening and closing sequence of these two switches 36 and 38 as a function of time is plotted on the graph of FIGS. 9 and 10 for two complete cycles T3, T4. It can thus be seen that as soon as the first switch 36 goes from the closed state to the open state, the second switch 38 goes from the open state to the closed state, while opening of the second switch 38 is delayed relative to opening of the first switch 36. The open state "O" of the main switch 22 thus initially coincides with the closed state "C" of the first control switch 36, and subsequently with the closed state "C" of the second control switch 38 (see the graphs of FIGS. 6, 9, and 10).

More particularly, the control means 34 comprise a first control circuit 40 for controlling the first control switch 36 as a function of a parameter that depends on the magnitude of the current in the primary circuit 20.

Thus, the first control circuit 40 comprises a first branch 42 connecting the control terminal 36A of the first switch 36 to a first resistor element 44 forming a shunt, the shunt 44 being connected in the primary circuit 20 in series with the primary winding Lp and the main switch 22. In this example, the shunt 44 comprises a set of two resistors connected in parallel.

In conventional manner, the shunt 44 delivers at its terminals a voltage V44 that is proportional to the magnitude of the primary current. In order to filter low frequencies from the voltage signal across the terminals of the shunt 44, the first branch 42 further comprises a conventional low frequency filter element 46 comprising a capacitor element 46C connected in parallel with a resistor element 46R.

Preferably, the device 10 also includes a feedback circuit 48 comprising a capacitor element 48C such as a capacitor, and a resistor element 48R such as a resistor connected in series with the capacitor 48C and connecting the control terminal 22A of the main switch 22 to the input terminal LA of one of the secondary windings L1, L2, L3, e.g. the input terminal LA of the winding L1 (FIG. 2). In particular, activation of the feedback circuit 48 coincides with opening the main switch 22.

When the main switch 22 is in the closed state, the voltage between the input terminal LA and the control terminal 22A is positive and the capacitor 48C is in the charged state. The first control switch 36 changing from the open state to the closed state causes the grid 22A of the main switch 22 to be connected to ground M and triggers opening of said main switch 22. Triggering the opening of this main switch 22 causes the voltage across the terminals of the secondary windings to reverse, and the voltage between the input terminal LA and the control terminal 22A becomes negative, thereby causing the capacitor 48C to discharge through the resistor 48R. The effect of this discharge is to accelerate the drop in voltage at the control terminal of the main switch 22A, and thus guarantees that the main switch 22 opens fully relatively fast.

Furthermore, in order to correct for possible untimely variations in the output voltage V1, V2, or V3 generated by each secondary circuit, and that would run the risk of damaging their loads, the control parameter for the first switch 36 also depends on a correction voltage VC generated when a reference threshold voltage is exceeded, and defined in association with one of the load powering outputs as the corresponding output voltage. For example, a voltage V1Ref is defined for the output voltage V1, this voltage V1Ref being equal to 12 volts. The correction voltage VC is preferably also generated during a variation in the output voltage V1 when the output voltage V1 is greater than the reference threshold voltage V1Ref.

To this end, the first control circuit 40 also includes a second branch 50 provided with a resistor 50R connecting the control terminal 36A of the first switch 36 to a second resistor element 52R such as a shunt-forming resistor that delivers at its terminals the correction voltage VC.

In the example described, the control parameter thus depends on the sum of two voltages: the correction voltage VC at the terminals of the second shunt 52R and the voltage V44 at the terminals of the first shunt 44.

The control means 34 also comprise a circuit 52 for generating the correction voltage VC, e.g. connecting an output terminal of one of the secondary circuits S1, S2, S3 to ground M (e.g. the output terminal corresponding to a terminal of the capacitor C1) and comprising the second shunt 52R and a reference member 53 connected in series with the shunt 52R, the reference member 53 allowing current to flow through the shunt 52R only when the voltage across the terminals of the member 53 exceeds the reference threshold voltage V1Ref.

Preferably, the reference member 53 comprises a zener diode 53Z having a reverse voltage of value substantially equal to the value of the reference voltage V1Ref, i.e. 12 volts in this example.

In addition, and advantageously, since the first control switch 36 and the reference member 53 are of the semiconductor junction type, the semiconductor junctions have thermal effects that compensate. For this purpose, the reference member 53 optionally also includes a conventional diode 53D connected in series with the zener diode 53Z, this diode likewise being of the semiconductor junction type.

In order to avoid sudden voltage variations in the output voltages V1, V2, V3 when the output voltage V1 is less than the reference threshold voltage V1Ref, the correction generator circuit 52 further includes a limiter member 52C for limiting variations in the output voltages V1, V2, V3 and connected in parallel with the reference member 53, this limiter member 52C allowing current to flow through the second shunt 52R only during variation in the output voltage V1. The limiter member 52C is constituted in this example by a conventional capacitor.

Thus, when the output voltage V1 is less than the reference voltage V1Ref, corresponding in this example to the reverse voltage of the zener diode 53Z, and when the output voltage V1 is substantially constant, no current flows through the resistor 52R, and consequently the correction voltage VC is zero.

In contrast, when the output voltage V1 varies while remaining less than the reference voltage V1Ref, the capacitor forming the limiter member 52C allows current to flow through the resistor 52R so that a non-zero correction voltage VC proportional to the magnitude of the current passing therethrough is generated across its terminals. This correction voltage VC is then added to the voltage V44 generated across the terminals of the shunt 44. This has the effect of reducing the duration of the closed state of the main switch 22, thereby reducing the duty ratio of the switch 22. In known manner, the duty ratio of the switch 22 is defined as being the ratio of the duration of the closed state of the switch 22 divided by the duration of one complete period (or cycle) of the switch 22.

Figure 3:
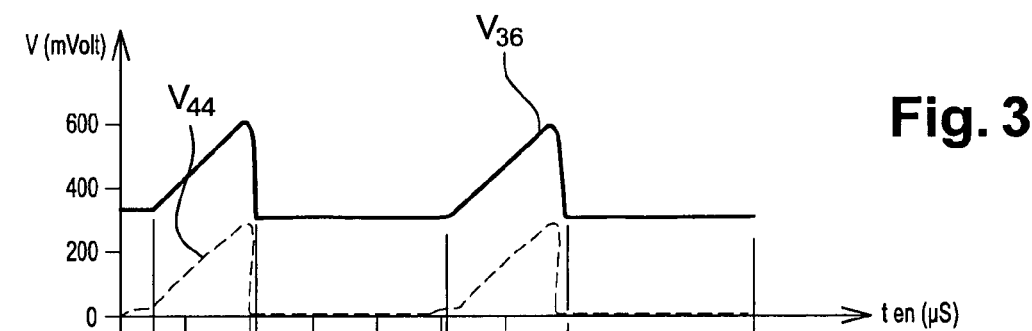
Figure 4:
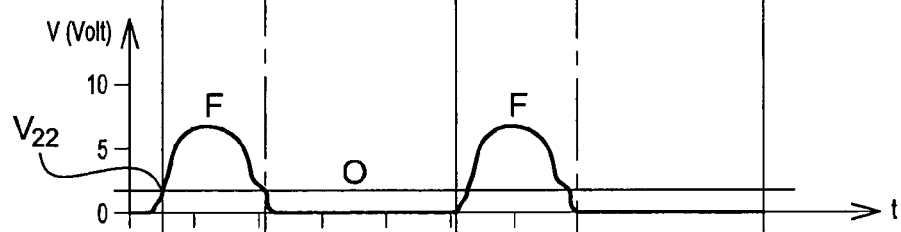
Figure 5:
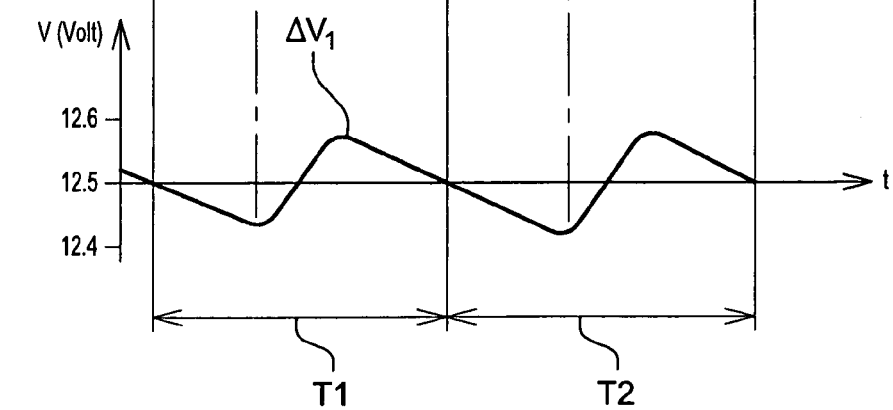

The graphs of FIGS. 3, 4, and 5 show two complete cycles of the device 10 referenced T1 and T2, as occur once the transient stage of starting the device has terminated. Thus, in the first cycle T1, the main switch is initially closed and the voltage V44 across the terminals of the shunt 44 increases linearly (see graph of FIG. 3). The control voltage V36 at the control terminal 36A also increases linearly and corresponds substantially to the sum of the voltage V44 plus the correction voltage VC. Thus, when the voltage V36 reaches the voltage threshold value of 0.7 volts at the control terminal 36A, this causes the first switch 36 to close and therefore connects the grid 22A of the main switch 22 to ground M. The feedback circuit 48 is then activated since the voltage across the terminals of the secondary winding L1 reverses, thereby causing the capacitor 48C to discharge and causing the main switch 22 to open completely. When the main switch is in the open state (i.e. the voltage at its control terminal is less than 2 volts), the capacitor C1 charges initially and then discharges when the magnitude of the secondary current becomes zero (or when the energy transferred during the input stage into the secondary circuit has then been used up), as shown in the graph of FIG. 5 plotting the variation ΔV1 across the terminals of the capacitor C1.

Furthermore, the control means 34 include a second control circuit 54 for controlling the second static switch 38 as a function of a second parameter depending on a reversal of the voltage V3 across the terminals of the secondary winding L3.

The second control circuit 54 preferably comprises a first branch 56 connecting the control terminal 38A of the second switch 38 to ground M and including a third resistor element 56R.

The second circuit 54 also includes a second branch 58 connecting the control terminal 38A to the secondary winding L3 and including a capacitor element 58C designed to be charged and discharged through the third resistor element 56R and a rectifier element 58D connected in series with the capacitor element 58C. Thus, the capacitor 58C is caused to charge by a reversal of the voltage across the terminals of the secondary winding L3.

As a result, closure of the first switch 36 triggers closure of the second switch 38. When the voltage at the control terminal of the first switch 36 reaches the closure threshold voltage of the first switch 36, the main switch 22 goes from the closed state to the open state, thereby causing the voltage across the terminals of each secondary winding L1, L2, or L3 to reverse. In particular, the voltage V1, V2, V3 across the terminals of each secondary winding L1, L2, or L3 becomes negative when the main switch 22 goes from the closed state to the open state. When the voltage V3 of the secondary winding L3 is negative, i.e. positive going from the end LB to the end LA of the winding L3, the diode 58D passes current and allows the capacitor 58C to charge so the voltage at the terminals of the third resistor element 56R increases until it reaches the threshold voltage for causing the second control switch 38 to close.

In addition, the voltage control means 34 for the main switch 22 include a third control circuit 60 for closing the main switch 22 activated during opening of the second control switch 38.

The third control circuit 60 preferably connects the control terminal 22A of the main switch 22 to one of the secondary windings L1, L2 or L3 (in this example the winding L3) and it includes an assembly comprising a capacitor element 60C and a first resistor element 60R1 connected in parallel and a second resistor element 60R2 connected in series with the assembly, the capacitor element 60C being designed to be charged during a reversal of the voltage across the terminals of the secondary winding L3 and discharged into the second resistor element 60R2 on opening of the second control switch 38. In particular, the rate of discharge of the capacitor 60C depends on the resistance of the resistor 60R1.

Thus, the main switch 22 is caused to close by opening the second control switch 38.

It can be seen from the graph of FIG. 8 that the capacitor 58C discharges during a predetermined duration, during which the main switch 22 is held in the open state. The capacitor 60C charges, being fed, like the capacitor 58C, with current by the secondary circuit S3, and then it discharges as soon as the magnitude of the current flowing in the secondary circuit S3 becomes zero (corresponding to using up the energy stored in the transformer 14 during the entry stage) via the resistor 60R2, which resistor is connected to ground M so long as the second switch 38 is in the closed state.

As soon as the voltage across the terminals of the their resistor element 56R becomes less than the threshold voltage of the transistor 38, the transistor 38 switches to the off state. The control terminal 22A of the main switch 22 is then no longer connected to ground M, but rather to the resistor 60R2 through which the capacitor 60C continues to discharge (see FIG. 7). The control voltage V22 then becomes greater than the threshold voltage, thereby triggering closure of the main switch 22 and initiating a new cycle.

Thus, the graphs of FIGS. 7 and 8 show how the voltages across the capacitors 58C and 60C vary during two complete cycles T3, T4 in the operation of the device 10. At the beginning of cycle T3, at time t1, the main switch goes from the closed state "C" to the open state "O" (FIG. 6). The opening of the main switch 22 then causes the voltage to reverse at the terminals of the secondary winding L3 having the capacitor 58C connected thereto. The voltage reversal at the terminals of the secondary winding L3 causes the diodes 58D and 60D to go from the off state to the on state and thus causes the capacitors 58C and 60C to charge (see the graphs of FIGS. 7 and 8). The voltages across the terminals of the resistors 58R and 56R increases until the voltage across the terminals of the resistor 56R reaches the threshold of 0.7 volts, causing the second control switch 38 to close "C", thereby enabling the connection of the main switch 22 to ground M to be maintained. This connection is maintained until the voltage across the terminals of the resistor 56R drops below a threshold of substantially 0.6 volts at time t2 during the discharging of the capacitor 58C, thereby causing the second switch 38 to open "O" (FIG. 10). The control terminal 22A is no longer connected to ground M and is fed by the capacitor 60C discharging through the resistor 60R2, thereby causing the switch 22 to close at time t2. The magnitude of the primary current then increases in linear manner until the voltage V36 reaches the closure threshold value for the first switch 36 at time t3. The cycle T4 begins at this instant t3.

In conventional manner, the device 10 includes starter means 62 for starting the device 10, these means comprising a starter circuit 64 connecting the control terminal 22A of the main switch to a contactor 66. The starter circuit 64 comprises a capacitor 64C and a resistor 64R connected in series with the capacitor 64C. The contactor 66 enables a power supply source to be connected optionally to the starter circuit 64, e.g. the battery of the motor vehicle, respectively as a function of its "contact" or "no contact" position.

Furthermore, the device 10 also includes a circuit 68 connecting the terminal 22A to the correction voltage generator circuit so as to limit the rise in voltage between the terminal 22A and ground M. In conventional manner, this circuit 68 comprises a rectifier diode 68D.

The main aspects of the operation of the device 10 that are associated with the invention are described below. It is assumed initially that the device 10 is operating cyclically and that the transient starting stage during which the initially discharged capacitors are in the process of starting has terminated. It is also assumed that the input voltage V1 is less than the reference voltage V1Ref of 12 volts, e.g. VE has a value of 7 volts.

Under such circumstances, the duty ratio of the main switch 22 is relatively high so as to enable sufficient energy to be transferred in spite of a relatively low input voltage V1. Since the voltage VE is relatively low, this is associated with the fact that the magnitude of the primary current increases linearly, but at a rate that is relatively low. As a result, the duration of the closed state "C" of the main switch 22 is relatively long, of the order of 12 microseconds (μs). In contrast, the duration of the capacitor 58C discharging does not vary with the value of the input voltage VE, such that the duration for which the switch 22 is open does not vary significantly with the value of the input voltage VE. The duration for which the main switch is open is defined by a variable duration that depends on the demagnetization time of the secondary circuit and also on a constant timing duration determined by the duration for the capacitor 58C to discharge. Consequently, the duty ratio of the main switch 22 is relatively high when the voltage VE is equal to 7 volts, as compared with the duty ratio of the switch 22 when the voltage VE is equal to 12 volts.

In the event of a sudden variation in the input voltage VE, the correction generator circuit 52 serves advantageously to limit any untimely increase in the output voltages V1, V2, V3 that would run the risk of damaging the loads connected to said circuits.

In the event of a variation in the output voltage V1 smaller than the reference voltage V1Ref, and corresponding to a variation in the input voltage VE, the capacitor 52C that is sensitive to variations in the output voltage V1 allows current to flow through the correction shunt 52R. The correction voltage VC is then no longer zero and is added to the voltage V44 across the shunt 44, enabling the first switch 36 and then the second switch 38 to close early and thus enabling the main switch 22 to open early so as to shorten the closure duration of the main switch 22, thereby reducing the duty ratio. If no account were taken of this sudden variation in the input voltage VE, the duty ratio of the switch 22 would be maintained at a high value, thus running the risk of damaging the loads to which the secondary circuits are connected.

Thus, in the event of a sudden variation in the input voltage VE, e.g. from a value of 5 volts to a value of 30 volts, a correction voltage VC is generated across the terminals of the shunt 52R since the capacitor 52C transmits the variation in the corresponding output voltage V1 to the correction shunt 52R by allowing currents to flow through the correction generator circuit 52.

In the event that the variation in the input voltage VE leads to the output voltage V1 exceeding the reference threshold voltage V1Ref, the zener diode 53Z allows current to flow through the correction shunt 52R and a voltage VC is generated across the terminals of the shunt 52R, which voltage is added to the voltage V44 across the terminals of the shunt 44.

By way of example, variation in the voltage 22A across the terminals of the main switch 22 (FIG. 11) and variation in the voltage V58C across the terminals of the capacitor 58C are shown for an input voltage VE equal to 35 volts. Under such circumstances, it can be seen that the duty ratio of the main switch is relatively low.

Consequently, the device 10 enables the duty ratio of the switch 22 to be adapted as a function of the input voltage VE so as to avoid damaging the electric members powered by the device 10 in the event of sudden and untimely variations in the input voltage VE.

In addition, the device 10 serves to avoid the main switch 22 being blocked in a linear mode, i.e. a mode in which the device 10 does not operate cyclically, the main switch 22 being held in the closed state. This can occur in particular in the event of a malfunction of the feedback circuit, e.g. as a result of an electromagnetic disturbance forming a high-energy pulse across the terminals of the feedback circuit and preventing the feedback from occurring. Under such circumstances, the diode 60D is in the off state so that the capacitor 60C discharges through the resistor 60R2 at a rate of discharge that is imposed by the resistance of the resistor 60R1 (see FIG. 7). This discharge has the effect of causing a drop in the potential at the control terminal 22A and thus of opening the switch 22. As a result, it is possible to select the resistance of the resistor 60R1 in such a manner as to limit the duration for which the switch 22 is closed in linear operation, and thus cause the device 10 to stop relatively quickly.

Thus, the dispenser 10 protects the electric components from heating excessively by limiting the length of time for which the device operates in linear mode.

The invention claimed is:

1. A device for generating a regulated output voltage from an input voltage coming from an electric power supply source, the device being of the type comprising:
    an energy-storage transformer having magnetically coupled primary and secondary windings;
    a primary circuit connecting the power supply source to a ground, and comprising the primary winding and a static main switch connected in series;
    a secondary winding designed to be connected to a load, and including the secondary winding; and
    voltage control means for controlling the static main switch and comprising a first static control switch connecting a control terminal of the static main switch to ground;
    wherein the voltage control means of the static main switch include a second static control switch connecting the control terminal of the static main switch to ground, closure of the first control switch triggering closure of the second control switch, and opening of the second control switch being delayed relative to opening of the first control switch,
    wherein the control means comprise a first control circuit for controlling the first static switch as a function of a first parameter that depends on the magnitude of the current flowing in the primary circuit, and
    wherein the first control circuit comprises a first branch connecting a control terminal of the first switch to a first resistor element forming a shunt, the shunt being connected in the primary circuit in series with the primary winding and the main switch.

2. A device according to claim 1, wherein the control parameter of the first switch also depends on a correction voltage generated when a reference threshold voltage is exceeded by the output voltage and/or when the output voltage varies while the output voltage remains below the reference threshold voltage.

3. A device according to claim 2, wherein the first control circuit further comprises a second branch connecting the control terminal of the first switch to a second resistor element forming a shunt and delivering the correction voltage across its terminals.

4. A device according to claim 3, wherein the control means comprise a correction generator circuit for generating a correction voltage for correcting the output voltage, said circuit connecting an output voltage generator terminal of the secondary circuit to ground and comprising a second shunt and a reference member connected in series with the second shunt, said reference member allowing current to flow through the second shunt only in the event of the output voltage exceeding the reference threshold voltage.

5. A device according to claim 4, wherein the reference member comprises a zener diode having a reverse voltage of value substantially equal to the value of the reference threshold voltage.

6. A device according to claim 1, wherein the correction generator circuit further comprises a limiter member for limiting variations in the output voltage when the output voltage remains below the reference threshold voltage, the limiter member being connected in parallel with the reference member and allowing current to flow through the second shunt only in the event of a variation in the output voltage.

7. A device according to claim 3, wherein the first control switch and the reference member are of the semiconductor junction type, with the semiconductor junctions having thermal effects that compensate each other.

8. A device for generating a regulated output voltage from an input voltage coming from an electric power supply source, the device being of the type comprising:
   an energy-storage transformer having magnetically coupled primary and secondary windings;
   a primary circuit connecting the power supply source to a ground, and comprising the primary winding and a static main switch connected in series;
   a secondary winding designed to be connected to a load, and including the secondary winding; and
   voltage control means for controlling the static main switch and comprising a first static control switch connecting a control terminal of the static main switch to ground;
   wherein the voltage control means of the static main switch include a second static control switch connecting the control terminal of the static main switch to ground, closure of the first control switch triggering closure of the second control switch, and opening of the second control switch being delayed relative to opening of the first control switch,
   wherein the control means comprise a second control circuit for controlling the second static switch as a function of a second parameter depending on a reversal of the voltage across the terminals of the secondary winding, and
   wherein the second control circuit comprises a first branch connecting a control terminal of the second switch to a third resistor element and a second branch connecting the control terminal of the second switch to the secondary winding and including a capacitor element designed to be charged through the third resistor element and a rectifier element connected in series with the capacitor element in such a manner that the capacitor element is caused to be charged by a reversal of the voltage across the terminals of the secondary winding.

9. A device for generating a regulated output voltage from an input voltage coming from an electric power supply source, the device being of the type comprising:
   an energy-storage transformer having magnetically coupled primary and secondary windings;
   a primary circuit connecting the power supply source to a ground, and comprising the primary winding and a static main switch connected in series;
   a secondary winding designed to be connected to a load, and including the secondary winding;
   voltage control means for controlling the static main switch and comprising a first static control switch connecting a control terminal of the static main switch to ground; and
   a feedback circuit comprising a capacitor element and a resistor element connected in series with the capacitor element and in which the feedback circuit connects the control terminal of the main switch to the secondary winding;
   wherein the voltage control means of the static main switch include a second static control switch connecting the control terminal of the static main switch to ground, closure of the first control switch triggering closure of the second control switch, and opening of the second control switch being delayed relative to opening of the first control switch.

10. A device for generating a regulated output voltage from an input voltage coming source, the device being of the type comprising:
    an energy-storage transformer having magnetically coupled primary and secondary windings;
    a primary circuit connecting the power supply source to a ground, and comprising the primary winding and a static main switch connected in series;
    a secondary winding designed to be connected to a load, and including the secondary winding; and
    voltage control means for controlling the static main switch and comprising a first static control switch connecting a control terminal of the static main switch to ground;
    wherein the voltage control means of the static main switch include a second static control switch connecting the control terminal of the static main switch to ground, closure of the first control switch triggering closure of the second control switch, and opening of the second control switch being delayed relative to opening of the first control switch,
    wherein the voltage control means for controlling the main switch comprise a control circuit for closing the main switch and designed to be activated during opening of the second control switch, and
    wherein the closure control circuit connects the control terminal of the main switch to the secondary winding and comprises a capacitor element and a rectifier element connected in series with the capacitor element, the capacitor element being caused to charge by a reversal of the voltage across the terminals of the secondary winding and the capacitor element being caused to discharge by the second control switch opening.

11. A device according to claim 10, wherein the closure control circuit further comprises a resistor element connected in parallel with the capacitor element of the circuit in such a manner that the rate of discharge of the capacitor element depends on the resistance of the resistor element.

12. A device according to claim 1, wherein the transformer has at least two secondary windings together with as many secondary circuits, each for connection to a respective load.

13. A device according to claim 8, wherein the transformer has at least two secondary windings together with as many secondary circuits, each for connection to a respective load.

14. A device according to claim 9, wherein the transformer has at least two secondary windings together with as many secondary circuits, each for connection to a respective load.

15. A device according to claim 10, wherein the transformer has at least two secondary windings together with as many secondary circuits, each for connection to a respective load.

* * * * *